United States Patent
Peterson et al.

(10) Patent No.: US 11,500,544 B2
(45) Date of Patent: Nov. 15, 2022

(54) MANAGING DATA STRUCTURES IN A PLURALITY OF MEMORY DEVICES THAT ARE INDICATED TO DEMOTE AFTER INITIALIZATION OF THE DATA STRUCTURES

(71) Applicant: INTERNATIONAL BUSINESS MACHINES CORPORATION, Armonk, NY (US)

(72) Inventors: Beth Ann Peterson, Tucson, AZ (US); Lokesh Mohan Gupta, Tucson, AZ (US); Matthew Richard Craig, Sahuarita, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/736,221

(22) Filed: Jan. 7, 2020

(65) Prior Publication Data
US 2021/0208790 A1    Jul. 8, 2021

(51) Int. Cl.
*G06F 3/06*     (2006.01)
*G06F 12/08*    (2016.01)

(52) U.S. Cl.
CPC ............ *G06F 3/0616* (2013.01); *G06F 3/065* (2013.01); *G06F 3/0632* (2013.01);
(Continued)

(58) Field of Classification Search
CPC ...... G06F 3/0616; G06F 3/0632; G06F 3/065; G06F 3/0679; G06F 12/08; G06F 2212/1036; G06F 2212/214
See application file for complete search history.

(56) References Cited

U.S. PATENT DOCUMENTS 8,954,718 B1 * 2/2015 Raj .................. G06F 9/45545
                                                    713/1
9,569,367 B1    2/2017 Wigmore et al.
(Continued)

FOREIGN PATENT DOCUMENTS

CN    102142008    8/2011
CN    105389211    3/2016
(Continued)

OTHER PUBLICATIONS

Arulraj, J., et al., "Multi-Tier Buffer Management and Storage System Design for Non-Volatile Memory", ArXiv:1901.10938, Jan. 30, 2019, 17 pp.

(Continued)

*Primary Examiner* — Ryan Bertram
*Assistant Examiner* — Eric T Loonan
(74) *Attorney, Agent, or Firm* — Konrad Raynes Davda & Victor LLP; David W. Victor

(57) ABSTRACT

Provided are computer program product, system, and method for managing data structures in a plurality of memory devices that are indicated to demote after initialization of the data structures. Indication is made to data structures to demote after initialization from a first level memory device to a second level memory device. The first level memory device has lower latency than the second level memory device. In response to completing initialization of the data structures in the first level memory device, the data structures indicated to demote after initialization are copied from the first level memory device to the second level memory device and removing the data structures indicate to move after initialization from the first level memory device.

25 Claims, 10 Drawing Sheets

(52) U.S. Cl.
CPC ............ *G06F 3/0679* (2013.01); *G06F 12/08* (2013.01); *G06F 2212/1036* (2013.01); *G06F 2212/214* (2013.01)

(56) References Cited

U.S. PATENT DOCUMENTS

| | | | |
|---|---|---|---|
| 9,798,754 | B1 | 10/2017 | Shilane et al. |
| 9,811,276 | B1 | 11/2017 | Taylor et al. |
| 10,049,046 | B1 | 8/2018 | Michaud et al. |
| 10,235,291 | B1 | 3/2019 | Michaud et al. |
| 2002/0032671 | A1* | 3/2002 | Iinuma ............... G06F 16/10 |
| 2007/0038850 | A1* | 2/2007 | Matthews ............ G06F 9/4401 713/1 |
| 2013/0238676 | A1 | 9/2013 | Zha et al. |
| 2013/0290598 | A1 | 10/2013 | Fiske et al. |
| 2014/0164711 | A1* | 6/2014 | Loh ................... G06F 12/0862 711/136 |
| 2015/0067258 | A1* | 3/2015 | Jung .................. G06F 12/0868 711/119 |
| 2015/0280742 | A1 | 10/2015 | Liu et al. |
| 2016/0104093 | A1 | 4/2016 | Fletcher et al. |
| 2016/0188474 | A1 | 6/2016 | Wang et al. |
| 2016/0253265 | A1 | 9/2016 | Rapoport et al. |
| 2017/0004090 | A1 | 1/2017 | Karippara et al. |
| 2017/0075812 | A1 | 3/2017 | Wu et al. |
| 2017/0286302 | A1* | 10/2017 | Roy .................... G06F 12/1027 |
| 2018/0052767 | A1 | 2/2018 | Berke et al. |
| 2018/0267911 | A1 | 9/2018 | Ware et al. |
| 2019/0004968 | A1 | 1/2019 | Gao et al. |
| 2019/0042145 | A1 | 2/2019 | Pham et al. |
| 2019/0079877 | A1 | 3/2019 | Gaur et al. |
| 2019/0370177 | A1* | 12/2019 | Olderdissen ........ G06F 12/0871 |

FOREIGN PATENT DOCUMENTS

| | | |
|---|---|---|
| CN | 108920387 | 11/2018 |
| CN | 109144791 | 1/2019 |
| CN | 110032530 | 7/2019 |

OTHER PUBLICATIONS

Freitas, R.F., et al., "Storage-Class Memory: The Next Storage System Technology", IBM Journal of Research and Development, vol. 52, No. 4/5, Jul./Sep. 2008, 9 pp.

IBM Corporation, "Storage Class Memory", Jan. 2013, 27 pp.

Kang, Y., et al., "Object-Based SCM: An Efficient Interface for Storage Class Memories", Proceedings of the 2011 IEEE 27th Symposium on Mass Storage Systems and Technology, May 2011, 12 pp.

Oukid, I., et al., "On the Diversity of Memory and Storage Technologies", arXiv: 1908.07431, Jun. 4, 2018, 8 pp.

Ustigov, D., et al., "Design Guidelines for High-Performance SCM Hierarchies", arXiv:1801.06726, Mar. 7, 2019, 16 pp.

List of IBM Patents or Patent Applications Treated as Related, Jan. 7, 2020, 2 pp.

U.S. Appl. No. 16/736,321, filed Jan. 7, 2020.

U.S. Appl. No. 16/736,272, filed Jan. 7, 2020.

International Search Report and Written Opinion for International Application No. PCT/IB2020/061949, dated Mar. 23, 2021, 10 pp. [18.907 (ISR & WO)].

International Search Report and Written Opinion for International Application No. PCT/IB2020/061952, dated Mar. 23, 2021, 10 pp. [18.908 (ISR & WO)].

Office Action 1 for U.S. Appl. No. 16/736,321, dated Mar. 29, 2021, 22 pp. [18.906 (OA1)].

Office Action 1 for U.S. Appl. No. 16/736,272, dated Mar. 29, 2021, 26 pp. [18.907 (OA1)].

Response dated Jul. 1, 2021, pp. 15, to Office Action dated Mar. 29, 2021, pp. 22, for U.S. Appl. No. 16/736,321, (18.906).

Response dated Jul. 1, 2021, pp. 18, to Office Action dated Mar. 29, 2021, pp. 26, for U.S. Appl. No. 16/736,221, (18.907).

Response to Final Office Action for U.S. Appl. No. 16/736,321, dated Oct. 26, 2021, 14 pp. [18.906 (RFOA1)].

Response to Final Office Action for U.S. Appl. No. 16/736,272, dated Oct. 26, 2021, 18 pp. [18.907 (RFOA1)].

Final Office Action dated Aug. 26, 2021, pp. 32, for U.S. Appl. No. 16/736,321, (18.906).

Final Office Action dated Aug. 26, 2021, pp. 33, for U.S. Appl. No. 16/736,272, (18.907).

Advisory Action dated Nov. 16, 2021, pp. 14, for U.S. Appl. No. 16/736,321, (18.906).

Advisory Action dated Nov. 16, 2021, pp. 14, for U.S. Appl. No. 16/736,221, (18.907).

Final Office Action dated May 13, 2022, pp. 30, for U.S. Appl. No. 16/736,321, (18.906).

Response dated Jun. 10, 2022, pp. 17, to Final Office Action dated May 13, 2022, pp. 30, for U.S. Appl. No. 16/736,321, (18.906).

Response to Office Action 3 for U.S. Appl. No. 16/736,272, dated Apr. 3, 2022, 23 pp. [18.907 (ROA3)].

Response to Office Action 3 for U.S. Appl. No. 16/736,321, dated Apr. 1, 2022, 15 pp. [18.906 (ROA3)].

Office Action dated Feb. 17, 2022, pp. 31, for U.S. Appl. No. 16/736,321, (18.906).

Office Action dated Feb. 17, 2022, pp. 32, for U.S. Appl. No. 16/736,221, (18.907).

Final Office Action2 dated Aug. 16, 2022, pp. 32, for U.S. Appl. No. 16/736,272, (18.907).

* cited by examiner

Data Structure Information

MANAGING DATA STRUCTURES IN A PLURALITY OF MEMORY DEVICES THAT ARE INDICATED TO DEMOTE AFTER INITIALIZATION OF THE DATA STRUCTURES

BACKGROUND OF THE INVENTION

1. Field of the Invention

The present invention relates to a computer program product, system, and method for managing data structures in a plurality of memory devices that are indicated to demote after initialization of the data structures.

2. Description of the Related Art

A storage class memory (SCM) system utilizes low latency Dynamic Random Access Memory (DRAM) and one or more higher latency flash NAND memory devices, which are less expensive than DRAM, to provide greater storage in the memory or cache at a lower cost by using higher latency, lower cost NAND devices. SCM allows system memory to be expanded with fast access non-volatile memory NAND devices.

Flash memory devices have less endurance than DRAM as there are a limited number of erase cycles for flash bit cells, far less so than for DRAM cells. One technique in the prior art to reduce wear on the flash memory devices is to use wear leveling techniques that distribute writes across multiple flash memory cells in the same or different device to avoid overuse of specific flash memory cells.

There is a need in the art for improved techniques for managing the storage of data in the multiple memory devices in a memory subsystem, such as an SCM system.

SUMMARY

Provided are computer program product, system, and method for managing data structures in a plurality of memory devices that are indicated to demote after initialization of the data structures. Indication is made to data structures to demote after initialization from a first level memory device to a second level memory device. The first level memory device has lower latency than the second level memory device. In response to completing initialization of the data structures in the first level memory device, the data structures indicated to demote after initialization are copied from the first level memory device to the second level memory device and removing the data structures indicate to move after initialization from the first level memory device.

With the above embodiment, very infrequently accessed data structures may be moved to a lower level memory device for continual storage because they are infrequently accessed and read access can be serviced from the lower level memory device. However, if there is a need to write to the data structure indicated as demote after initialization, then the data structure may be moved into the first level memory device for one or more write operations to that data structure. When the write operations are completed, the data structure may be demoted from the first level memory device and moved to a lower level memory device because the data structure will unlikely be write accessed for a substantial time.

In a further embodiment, access counts are maintained for the data structures stored in the first level memory device that are not indicated to demote after initialization, wherein access counts are not maintained for data structures indicated to demote after initialization.

With the above embodiment, access counts are not needed for data structures that are automatically demoted after being updated or initialized because they are vacated from the first level memory device after being used without regard to access counts.

In a further embodiment, the access counts are used to select data structures to remove from the first level memory device and retain in the second level memory device to free space in the first level memory device. The access counts are used to determine whether to remove accessed data structures from the second level memory device.

With the above embodiment, using access counts to determine whether to store data structures in a low latency or high latency storage allows improves system performance by placing the high access count data in low latency storage to optimize system performance and place low access count data in higher latency storage, which will have less effect on system performance because low access count data is less frequently accessed.

In a further embodiment, an update is received to a data structure indicated to demote after initialization. The data structure to update is copied from the second level memory device to the first level memory device to update. The updated data structure is copied from the first level memory device to the second level memory device and the updated data structure is deleted from the first level memory device.

With the above embodiment, system performance is improved by moving the updated data structure being indicated to demote after initialization to the lower latency memory device to perform the update. The data structure is then deleted from the first level memory device after being updated because it is unlikely to be accessed given that a data structure indicated to demote after initialization is accessed very infrequently.

Further provided are a computer program product, system, and method for managing data in a plurality of memory devices in a computing system. An update is received to a data structure indicated to demote from a first level memory device. The data structure to update is copied from a second level memory device to the first level memory device to update. The first level memory device has lower latency than the second level memory device. The updated data structure is copied from the first level memory device to the second level memory device and deleted from the first level memory device in response to updating the data structure.

With the above embodiment, system performance is improved by moving the updated data structure being indicated to demote to the lower latency memory device to perform the update, and then deleted from the first level memory device after being updated because it is unlikely to be accessed given that a data structure indicated to demote after initialization is accessed very infrequently. Removing an infrequently accessed data structure from the low latency device to a higher latency device for storage improves system performance by maximizing free space in the low latency device to be available for more frequently accessed data structures.

In a further embodiment, the update to the data structure is to at least one field in the data structure to update that is less than all the fields in the data structure. Copying the data structure comprises copying only the at least one field to update from the data structure to the first level memory device, wherein the copying the updated data structure comprises copying the updated at least one field from the first level memory device to the second level memory device and deleting the updated at least one field from the first level memory device.

With the above embodiment, the low latency first level memory space is further conserved and optimized by only copying fields to update from the data structures in the second level memory device to the first level memory device to update.

In a further embodiment, the data structure to update is in the second level memory device. A determination is whether the update comprises an update event of a plurality of predefined update events. The data structures are copied to update to the first level memory device in response to determining the update comprises the update event. A plurality of writes to the data structure are performed as part of the update event. The data structure updated as part of the update event are copied from the first level memory device to the second level memory device and deleting the updated data structure from the first level memory device in response to completing the writes for the update event.

With the above embodiment, data structures that are to be demoted after being updated or initialized are copied to the first level memory device if they are going to be subject to a burst of writes, although generally infrequently accessed. Such data structures may be periodically staged into the first level memory device for a burst of writes as part of operations to update system configuration files. Because such configuration files are very infrequently updated, after the update event, the system data structure may be moved back to a lower level memory device for storage and access. This frees up space in the faster access first level memory device for other more frequently accessed data.

DETAILED DESCRIPTION

System control structures used to define logical devices in the computing system may be maintained in the main DRAM memory. However, as the DRAM gets to an almost full level, time consuming memory management processes are used to move the data structures in DRAM to a lower level storage, such as a higher latency NAND type flash memory or disk storage.

Described embodiments provide improved computer technology for managing data structures in a memory subsystem comprised of a plurality of different level memory devices having different characteristics, such as a lowest latency first level memory device, e.g., DRAM, and different higher latency, less expensive lower level memory devices, e.g., NAND flash memory. With described embodiments, access counts are used to determine when to move data structures from the first level memory device to a lower level memory device having higher latency. The access counts may also be used to determine whether to maintain multiple copies of a data structure in the first level memory device and a lower level memory device based on access thresholds maintained for different lower level memory devices to match placement of the data structures in lower level memory devices having suitable endurance profiles, e.g., number of erase cycles, to the access count profile of the data structures.

In further embodiments, the access count may be used to determine whether to maintain multiple copies of a data structure in multiple of the memory devices when accessing a data structure or just leave in the first level memory device. Data structures that are less frequently accessed than most frequently updated data structures may be indicated as swappable to allow for storage in lower level memory devices having higher latency, whereas the most frequently accessed data structures may not be swappable and remain in the lowest latency first level memory device.

Yet further, the access count may comprise separate read and update counts to use to determine whether to move less frequently updated data structures to lower level memory devices. Further, there may be more expensive of the lower level memory devices having a higher endurance, such as allowing for more erase cycles, and only the highest access count data structures are placed in those lower level memory devices having greater endurance and those data structures having a lower update count may be stored in less expensive lower level memory devices that have lower endurance, e.g., allow for fewer erase cycles. This allows for matching of data structures by update count with lower level memory devices based on the endurances of the lower level memory devices to optimize placement of the data structures among the lower level memory devices.

Figure 1:
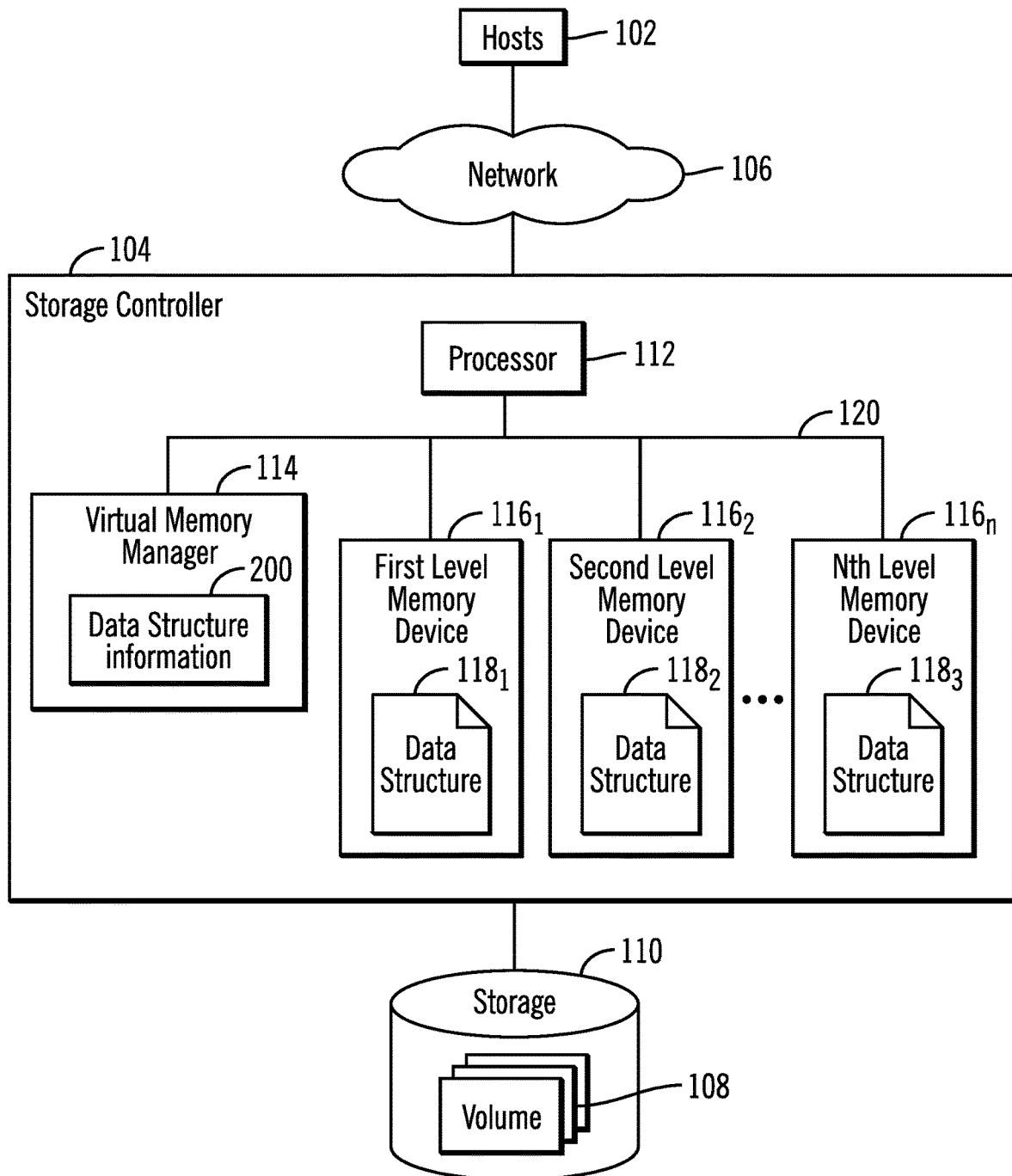
FIG. 1 illustrates an embodiment of a computing environment with a memory subsystem having a plurality of memory devices.

FIG. 1 illustrates an embodiment of a computing environment. A plurality of hosts 102 may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes one or more processors 112 and a memory subsystem, such as a storage class memory (SCM) memory system, having a virtual memory manager 114 to manage the placement of tracks in one of a plurality memory devices, such as a first level memory device $116_1$, a second level memory device $116_2$, through an nth level memory device $116_n$. The virtual memory manager 114 maintains data structure information 200 having information on data structures $118_1$, $118_2$, $118_3$, such as system data structures or objects, generated by an operating system during system initialization, that the virtual memory manager 114 processes to determine one or more level memory devices $116_1 \ldots 116_n$ on which to store system and other data structures. The virtual memory manager 114 may also maintain address translation tables to provide translation services and map tracks in the volumes 108 to physical or logical locations in the memory devices $116_1 \ldots 116_n$. The virtual memory manager 114 may further include algorithms to perform wear leveling to distribute write operations to different memory devices $116_2 \ldots 116_n$ and different locations within the memory devices, such as solid state storage devices (SSDs) or flash memory, that have a limited number of erase cycles to increase the life span of these lower level memory devices $116_1 \ldots 116_n$. In certain embodiments, the memory subsystem comprising the virtual memory manager 114 and level memory devices $116_1 \ldots 116_n$ may function as a cache for the storage controller 104 or other computing device.

The processor 112, virtual memory manager 114, and memory devices $116_1 \ldots 116_n$ may communicate over one or more bus interfaces 120. Further, the virtual memory manager 114 may communicate over different types and separate bus and device interfaces for different of the memory devices $116_1 \ldots 116_n$. For instance, a local memory interface may be used to communicate with the first level memory device $116_1$, such as for a DRAM, and a storage device interface may be used to communicate with the lower level memory devices $116_2 \ldots 116_n$, such as Non-Volatile Memory Express (NVME) to communicate with flash memory and SSDs.

In one embodiment, the first level memory device $116_1$ may comprise a high cost and very low latency device such as a Dynamic Random Access Memory (DRAM) or Static Random Access Memory (SRAM), and the lower level memory devices $116_1 \ldots 116_n$ may comprise less expensive and higher latency and higher capacity storage devices such as non-volatile random access memory (NVRAM), including Magnetoresistive Random Access Memory (MRAM), Phase Change Memory (PCM), Resistive Random Access Memory (RRAM), spin transfer torque memory (STM-RAM), conductive bridging RAM (CBRAM), NAND memory devices, such as flash memory and solid state drives (SSDs), etc. In one embodiment, the lower level memory devices $116_2 \ldots 116_n$ may have different endurance profiles with different number of available erase cycles, such that higher level of the memory devices $116_2 \ldots 116_n$ allow for a greater number of erase cycles, i.e., greater endurance, than the lower level of the memory devices $116_2 \ldots 116_n$. For instance, lower level memory device $116_i$ may have a greater endurance, i.e., higher number of erase cycles, than lower level memory device $116_j$, where i<j. There may be one or more lower level memory devices $116_i$.

The virtual memory manager 114 may comprise a separate processing or hardware device implemented as microcode or firmware in hardware devices in the storage controller 104, such as in Application Specific Integrated Circuits (ASICs). Alternatively, the virtual memory manager 114 may comprise a system having a processor executing code loaded into a memory device. Still further, the virtual memory manager 114 may be implemented as code loaded into the first level memory device $116_1$ and executed by the processor 112.

The storage 110 may comprise one or more storage devices known in the art, such as a solid state storage device (SSD), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The network 106 may comprise a Storage Area Network (SAN), a Local Area Network (LAN), a Wide Area Network (WAN), the Internet, and Intranet, etc.

Alternatively, the hosts 102 may connect to the storage controller 104 over a bus interface, such as a Peripheral Component Interconnect (PCI) bus interface and other interfaces known in the art.

Figure 2:
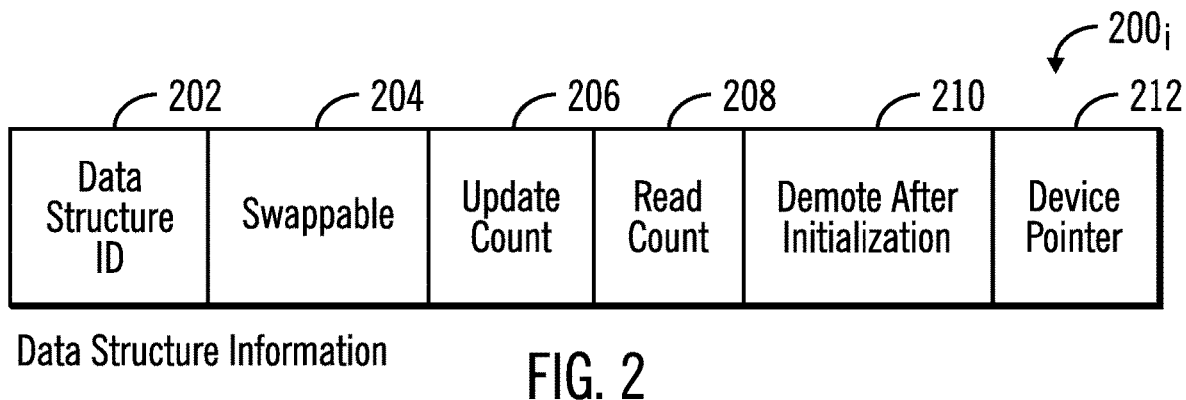
FIG. 2 illustrates an embodiment of data structure information to manage storage of data structures in the memory devices.

FIG. 2 illustrates an embodiment of an instance of the data structure information $200_i$ for a data structure including a data structure identifier (ID) 202, such as a file or object name; a swappable flag 204 indicating whether the data structure 202 may be regularly moved between the first level memory device $116_1$ and the lower level memory devices $116_2 \ldots 116_n$; an update count 206 indicating a number of times the data structure 202 has been updated within a measurement period; a read count 208 indicating a number of times the data structure 202 has been read a measurement period; a demote after initialization flag 210 indicating whether the data structure 202 is to be immediately demoted after being generated in the first level memory device $116_1$; and a device pointer 212 indicating the level memory device $116_1 \ldots 116_n$ in which the data structure 202 is currently stored.

In one embodiment, the swappable flag 204 and the demote after initialization flag 210 may be set by the operating system developer or administrator based on the estimated frequency the data structures will be accessed. For instance, data structures that are the most frequently updated or accessed may be marked as swappable to always retain in the fastest first level memory device $116_1$. Data structures $118_1$, $118_2$, $118_3$ that are less frequently accessed may be occasionally swapped to the lower level memory devices $116_2 \ldots 116_n$ to free space in the first level memory device $116_1$.

The update count 206 may be used to select a lower level memory device $116_i$ on which to store a data structure to match with the endurance, or available erase cycles. For instance, more frequently accessed data structures, those with a higher update count 206, may be placed on a lower level memory device $116_i$ having a higher endurance. In this way, each of the lower level memory devices $116_2 \ldots 116_n$ may be associated with a range of update counts. In an alternative embodiment, there may be just one access count for reads and/or writes used to determine when to swap a data structure out of the first level memory device $116_1$ and to select a lower level memory device $116_i$ to store the swapped data structure.

Data structure information $200_i$ indicated as not swappable 204 may not maintain access counts 206, 208 because such data structures are not managed between the memory devices based on their access.

The demote after initialization flag 210 may be set for data structures also indicated as not swappable 204 that are static and rarely, but sometimes changed. In such case, such very infrequently accessed data structures may be moved to a lower level memory device $116_i$ for continual storage because there will very infrequent write access and read access can be serviced from the lower level memory device $116_i$. However, if there is a need to write to the data structure indicated as demote after initialization 210, then the data structure may be moved into the first level memory device $116_1$ for one or more write operations to that data structure. When the write operations are completed, the data structure may be demoted from the first level memory device $116_1$ and moved to a lower level memory device $116_i$ because the data structure will unlikely be write accessed for a substantial time.

In one embodiment, the data structures managed by the virtual memory manager 114 may comprise data structures generated during system initialization or initial microcode load (IML), and include structures providing configuration information for hardware devices and logical devices, paths and subsystems, device characteristics, and settings. In alternative embodiments, the data structures may be generated by applications.

In certain embodiments, periodically, the virtual memory manager 114 may decrement the access counts, such as update 206 and read 208 counts, to reduce weighting of accesses over time. This provides that the strength of the access counts are time sensitive, and decay over time.

Figure 3:
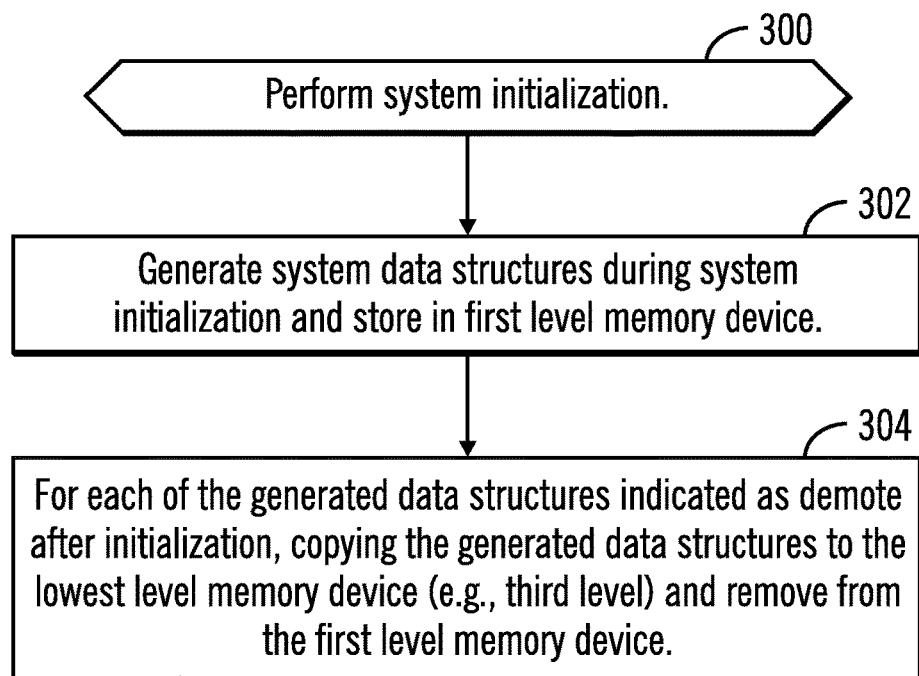
FIG. 3 illustrates an embodiment of operations to perform system initialization to generate initial system data structures.

FIG. 3 illustrates an embodiment of operations performed for system initialization of the storage controller 100 by an operating system of the storage controller 100, which may be maintained in the first level memory device $116_1$ and the virtual memory manager 114. Upon initiating system initialization (at block 300), the system data structures are generated (at block 302) and stored in the first level memory device $116_1$. For each of the generated data structures indicated as demote after initialization 210, the generated data structures are copied (at block 304) to the lowest level memory device (e.g., third level) and remove from the first level memory device $116_1$.

Figure 4:
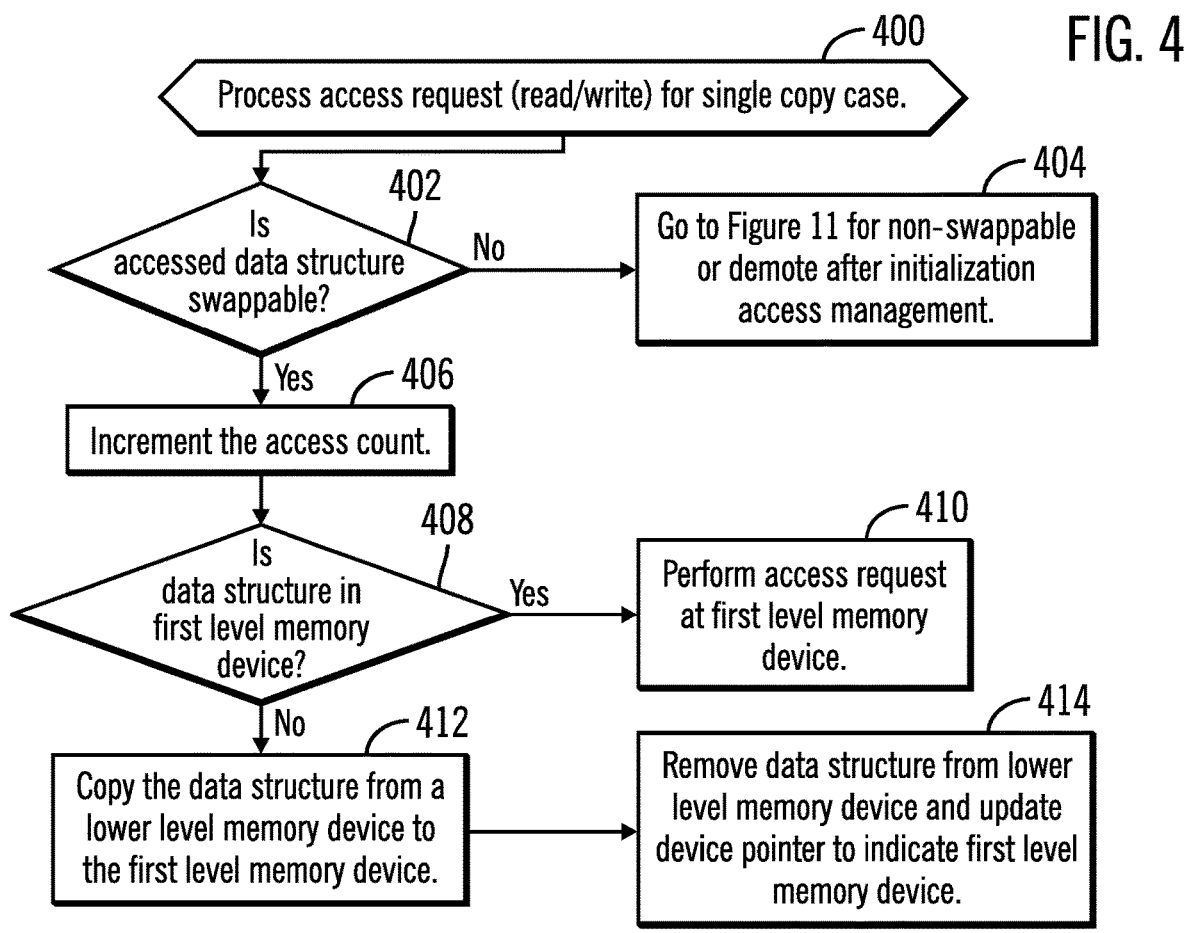
FIG. 4 illustrates an embodiment of operations to process an access request for a single copy case where only a single copy of data structures are stored throughout the memory subsystem.
Figure 5:
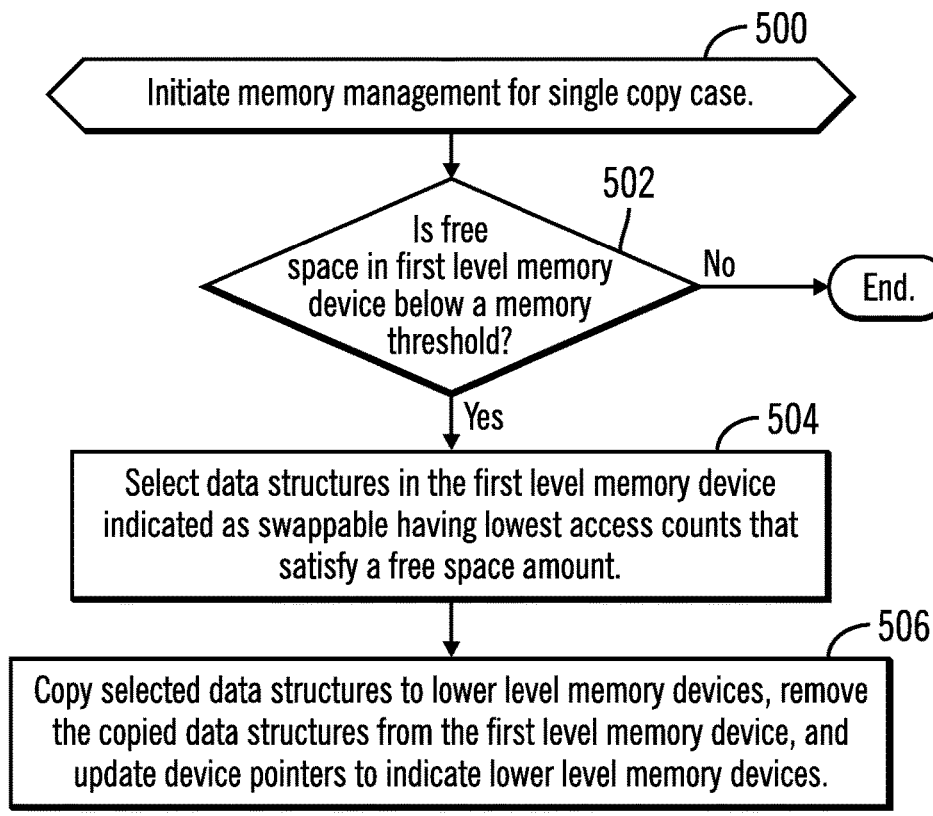
FIG. 5 illustrates an embodiment of operations to perform memory management operations to free space in a first level memory device for a single copy case where only a single copy of the data structures are stored throughout the memory subsystem.

FIG. 4 illustrates an embodiment of operations performed by the virtual memory manager 114 to process an access request, such as read or write, for a single copy case where only one copy of a data structure $118_i$ is maintained in the memory devices $116_1 \ldots 116_n$. Upon processing (at block 400) the access request, if (at block 402) the accessed data structure $118_i$ is not swappable 204, control proceeds to FIG. 11 for processing as a non-swappable data structure. If (at block 402) the swappable flag 204 in the data structure information $200_i$ for the accessed data structure $118_i$ indicates the data structure $118_i$ is swappable, then the access count is incremented (at block 406). In the embodiment of FIGS. 4 and 5, there may be just one access count for read and/or write accesses.

If (at block 408) the accessed data structure $118_i$ is in the first level memory device $116_1$, then the access request is performed (at block 410) at the first level memory device $116_1$. If the data structure $118_i$ is not in the first level memory device $116_1$, then the virtual memory manager 114 copies (at block 412) the data structure $118_i$ from a lower level memory device $116_i$ to the first level memory device $116_1$, removes (at block 414) the data structure $118_i$ from the lower level memory device $116_i$, and updates the device pointer 212 to indicate the first level memory device $116_1$.

With the embodiment of FIG. 4, the virtual memory manager 114 maintains a single copy of the data structures in one of the memory devices $116_i$, and moves a swappable data structure from a lower level memory device $116_i$ to the first level memory device $116_1$ when accessed.

FIG. 5 illustrates an embodiment of operations performed by the virtual memory manager 114 to free space in the first level memory device $116_1$ in the case where a single copy of the data structure $118_i$ is maintained in one of the memory devices $116_i$. Upon initiating (at block 500) memory management, if (at block 502) the amount of free space in the first level memory device $116_1$ is above a memory threshold, then control ends. If (at block 502) the amount of free space is below the memory threshold, then the virtual memory manager 114 selects (at block 504) data structures $118_i$ in the first level memory device $116_1$ indicated as swappable having lowest access counts that satisfy a free space amount. The selected data structures are copied (at block 506) to one of the lower level memory devices $116_i$, removed from the first level memory device $116_1$, and the device pointers 212 for the moved data structures are updated to point to the lower level memory devices $116_i$ to which they are added.

In one embodiment, the access counts for the selected data structures may be used to determine the lower level memory device in which the data structures are stored. If the lower level memory devices $116_i$ are ordered according to their endurance in terms of erasable cycles, with the lower numbered devices having a higher endurance than the higher number devices, e.g., memory device $116_2$ has a greater endurance than memory device $116_3$, then a data structure is placed in the memory device $116_i$ having a lowest level threshold exceeding the data structure access count.

With the embodiment of FIG. 5, to free space in the first level memory device $116_1$, the virtual memory manager 114 considers data structures having a lowest access count, because such data structures are less frequently updated and accessed and most suitable for storage in a lower level memory device $116_2 \ldots 116_n$.

Figure 6:
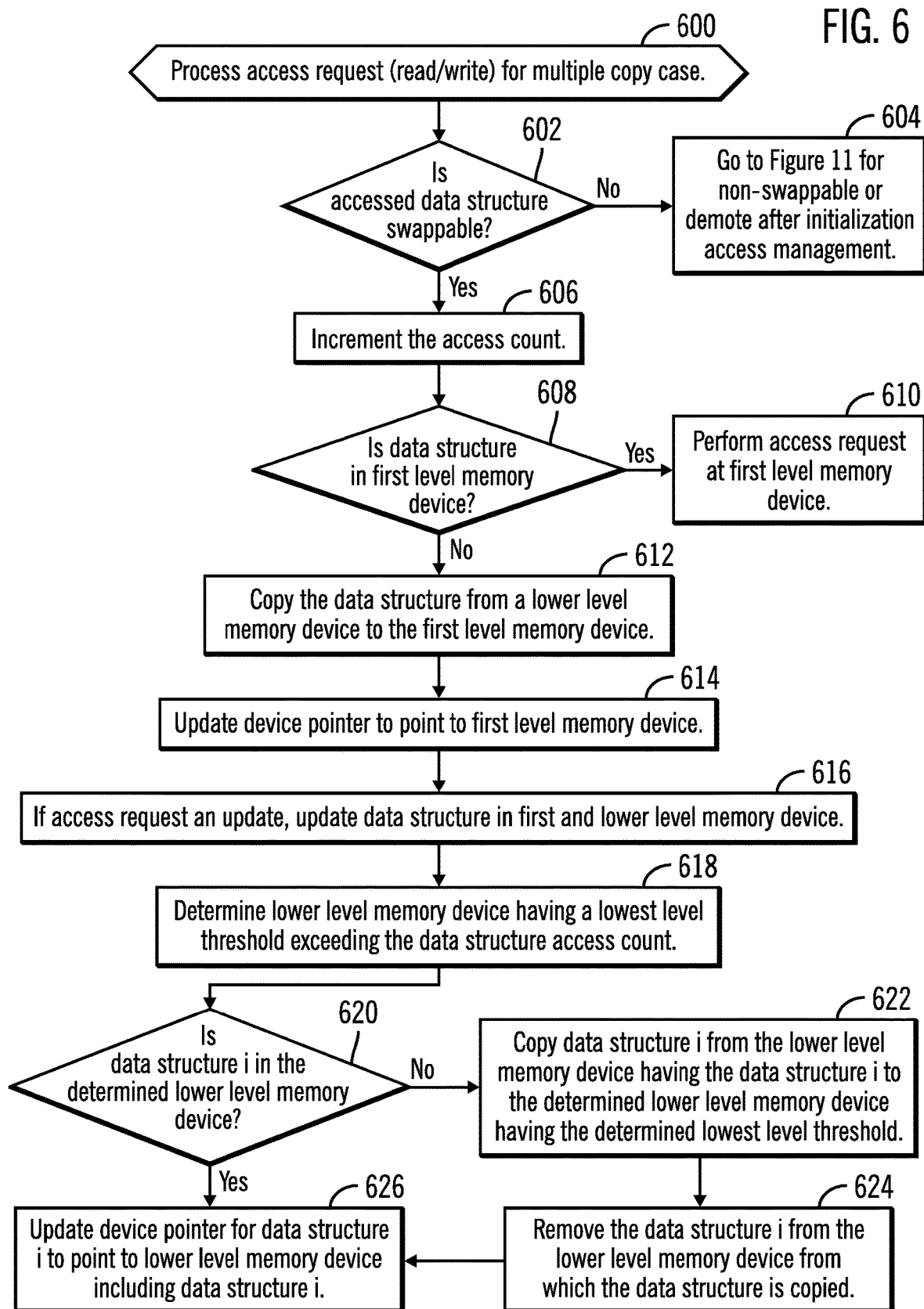
FIG. 6 illustrates an embodiment of operations to process an access request for a multiple copy case where multiple copies of data structures are stored throughout the memory subsystem.

FIG. 6 illustrates an embodiment of operations performed by the virtual memory manager 114 to process an access request where multiple copies of a data structure $118_i$ are maintained in multiple of the memory devices $116_1 \ldots 116_n$. With the embodiment of FIGS. 6 and 7 there is one access count comprising update 206 and/or read 208 counts. Upon processing (at block 600) the access request, if (at block 602) the accessed data structure $118_i$ is not swappable 204, control proceeds to FIG. 11 for processing as a non-swappable data structure. If (at block 602) the swappable flag 204 in the data structure information $200_i$ for the accessed data structure $118_i$ indicates the data structure $118_i$ is swappable, then the access count is incremented (at block 606).

If (at block 608) the accessed data structure $118_i$ is in the first level memory device $116_1$, then the access request is performed (at block 610) at the first level memory device $116_1$. If the data structure $118_i$ is not in the first level memory device $116_1$, then the virtual memory manager 114 copies (at block 612) the data structure $118_i$ from a lower level memory device $116_i$ to the first level memory device $116_1$ and updates (at block 614) the device pointer 212 to indicate the first level memory device $116_1$. If (at block 616) the access request is an update, the copies of the data structures in one or more memory devices are updated (at block 616).

The virtual memory manager 114 determines (at block 618) a lower level memory device $116_j$ having a lowest level threshold exceeding the data structure $118_i$ access count, which is the memory device having an endurance most suited for the access count of the selected data structure $118_i$. If (at block 620) the data structure $118_i$ is not in the determined lower level memory device $116_j$, then the virtual memory manager 114 copies (at block 622) the data structure $118_i$ from the lower level memory device $116_i$ currently having the data structure $118_i$ to the lower level memory device $116_j$ having the determined lowest level threshold and removes (at block 624) the data structure $118_i$ from the lower level memory device $116_i$ from which the data structure was copied. If (at block 620) the data structure $118_i$ is already in the determined lower level memory device $116_i$ or has been copied there (at block 622), then the device pointer 212 is updated (at block 626) to indicate the lower level memory device $116_j$ now having the data structure $118_i$.

With the embodiment of FIG. 6, an accessed data structure is moved to the first level memory device $116_1$ and also retained in a lower level memory device that comprises a lower level memory device having an endurance, erasable cycles, commensurate with the access count of the data structure. By matching the data structure by access count with a lower level memory device by endurance, data structures are stored in a lower level memory device having an endurance level most appropriate for the frequency of access of the data structure. Further, if the access count of the data structure is higher than the highest level threshold for the second memory level device $116_2$, then the data structure is removed from the memory level device $116_i$ having the data structure without moving the data structure to another memory level device because the access count is too high for lower level memory devices $116_2 \ldots 116_n$.

Figure 7:
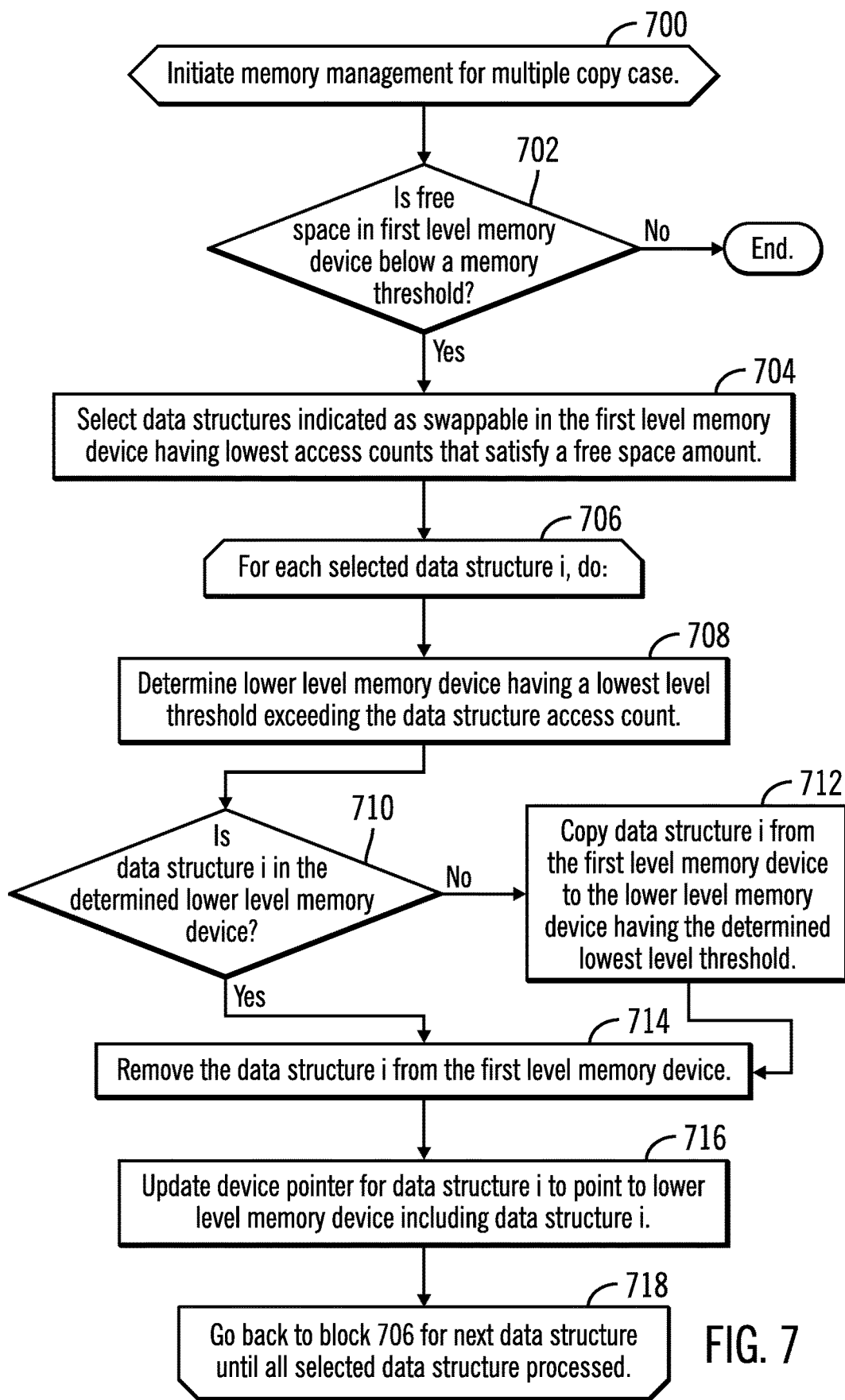
FIG. 7 illustrates an embodiment of operations to perform memory management operations to free space in a first level memory device for a multiple copy case where multiple copies of the data structures are stored throughout the memory subsystem.

FIG. 7 illustrates an embodiment of operations performed by the virtual memory manager 114 to perform memory management when copies of a data structure $118_i$ are maintained in multiple level memory devices $116_1 \ldots 116_n$. Upon initiating (at block 700) memory management for a multiple copy case, if (at block 702) the amount of free space in the first level memory device $116_1$ is above a memory threshold, then control ends. If (at block 702) the amount of free space is below the memory threshold, then the virtual memory manager 114 selects (at block 704) data structures $118_i$ in the first level memory device $116_1$ indicated as swappable having lowest access counts that satisfy a free space amount. The operations at blocks 706 through 718 are performed for each of the selected data structure $118_i$.

The virtual memory manager 114 determines (at block 708) a lower level memory device $116_j$ having a lowest level threshold exceeding the data structure $118_i$ access count, which is the memory device having an endurance most suited for the access count of the selected data structure $118_i$. If (at block 710) the data structure $118_i$ is not in the determined lower level memory device $116_j$, then the virtual memory manager 114 copies (at block 712) the data structure $118_i$ from the first level memory device $116_1$ to the lower level memory device $116_i$ having the determined lowest level threshold. If (at block 710) the data structure $118_i$ is already in the determined lower level memory device $116_i$ or has been copied there (at block 712), then the data structure $118_i$ is removed (at block 714) from the first level memory device $116_1$ and the device pointer 212 is updated (at block 716) to indicate the lower level memory device $116_i$ now having the data structure $118_i$.

With the embodiment of FIG. 7, to free space in the first level memory device $116_1$, the virtual memory manager 114 considers data structures having a lowest access count, because such data structures are less likely to be updated and accessed and most suitable for storage in a lower level memory device $116_2 \ldots 116_n$. The selected data structure having lowest access counts are removed from the first level memory device $116_1$ and retained in a lower level memory device $116_i$ having a level threshold containing the access count of the data structure to move.

Figure 8:
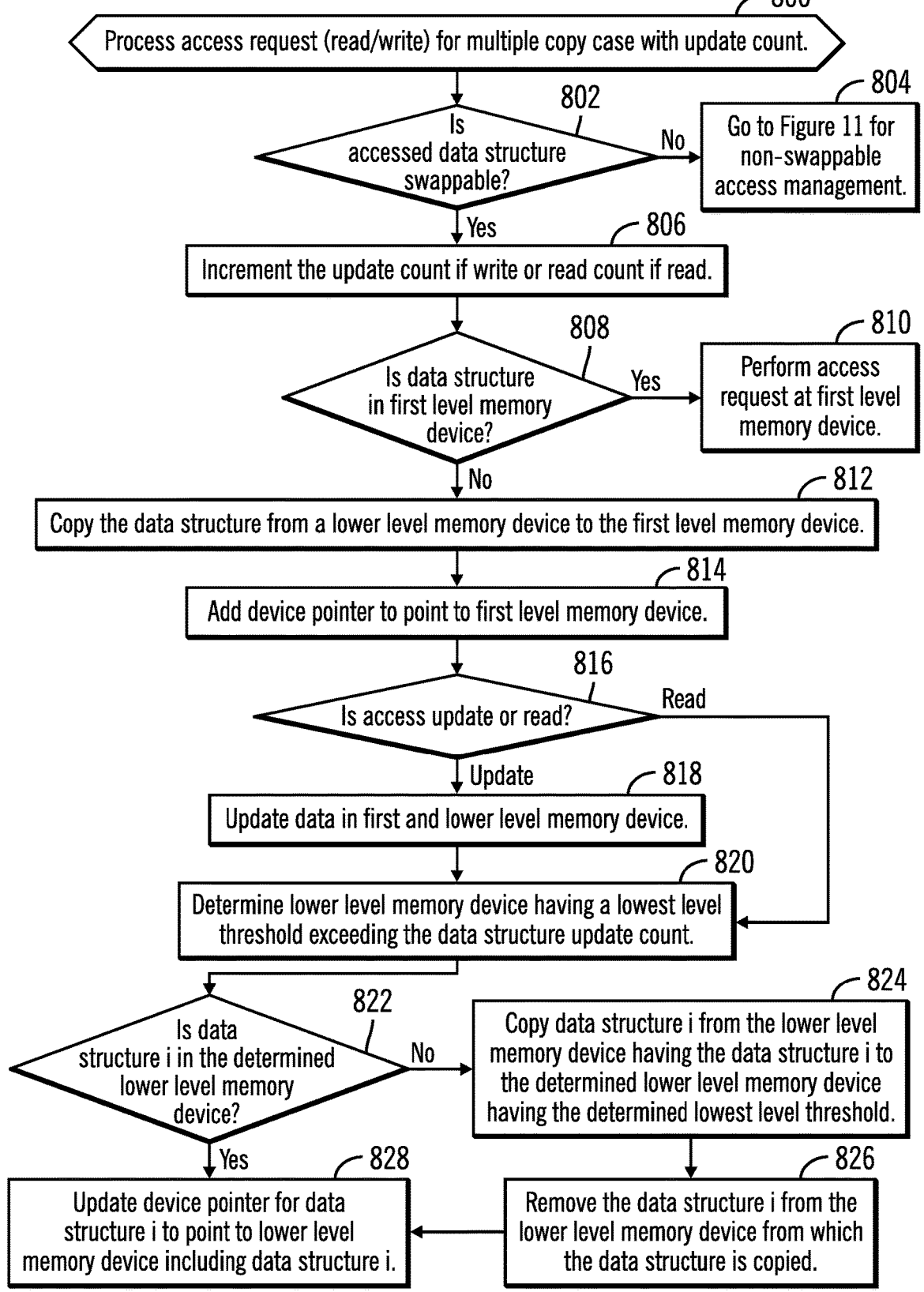
FIG. 8 illustrates an embodiment of operations to process an access request for a multiple copy case where multiple copies of data structures with separate update and read counts are stored throughout the memory subsystem.

FIG. 8 illustrates an embodiment of operations performed by the virtual memory manager 114 to process an access request where multiple copies of a data structure $118_i$ are maintained in multiple of the memory devices $116_1 \ldots 116_n$ and there are separate update 206 and read 208 counts. Upon processing (at block 800) the access request, if (at block 802) the accessed data structure $118_i$ is not swappable 204, control proceeds to FIG. 11 for processing as a non-swappable data structure. If (at block 802) the swappable flag 204 in the data structure information $200_i$ for the accessed data structure $118_i$ indicates the data structure $118_i$ is swappable, then the update count 206 is incremented (at block 806) if the access is a write and the read count 208 is incremented if the access is a read.

If (at block 808) the accessed data structure $118_i$ is in the first level memory device $116_1$, then the access (read or write) is performed (at block 810) at the first level memory device $116_1$. If (at block 808) the data structure $118_i$ is not in the first level memory device $116_1$, then the virtual memory manager 114 copies (at block 812) the data structure $118_i$ from a lower level memory device $116_i$ to the first level memory device $116_1$ and updates (at block 814) the device pointer 212 to indicate the first level memory device $116_1$. If (at block 816) the access request is an update, then the copies of the data structures in the first $116_1$ and lower level memory devices $116_i$ are updated (at block 818).

If the access is a read (from block 816) or updating the data (from block 818), the virtual memory manager 114 determines (at block 820) a lower level memory device $116_j$ having a lowest level threshold exceeding the data structure $118_i$ update count 206, which is the memory device having an endurance most suited for the update count of the selected data structure $118_i$. If (at block 822) the data structure $118_i$ is not in the determined lower level memory device $116_i$, then the virtual memory manager 114 copies (at block 824) the data structure $118_i$ from the lower level memory device $116_i$ having the data structure $118_i$ to the lower level memory device $116_j$ having the determined lowest level threshold and the data structure $118_i$ is removed (at block 826) from the lower level memory device $116_i$. Once the data structure is in the determined lower level memory device $116_j$ having the lowest level threshold (from block 822 or 826), the device pointer 212 is updated (at block 828) to indicate the lower level memory device $116_j$ now having the data structure $118_i$.

With the embodiment of FIG. 8, an accessed data structure is moved to the first level memory device $116_1$ and also retained in a lower level memory device that comprises a lower level memory device having an endurance, erasable cycles, commensurate with the update count of the data structure. By matching the data structure by update count with a lower level memory device by endurance, data structures are stored in a lower level memory device having a endurance level most appropriate for the update frequency of the data structure. Further, if the update count of the data structure is higher than the highest level threshold for the second memory level device $116_2$, then the data structure is removed from the memory level device $116_i$ having the data structure without moving the data structure to another memory level device because the update count is too high for the endurance profile of the lower level memory devices $116_2 \ldots 116_n$.

Figure 9:
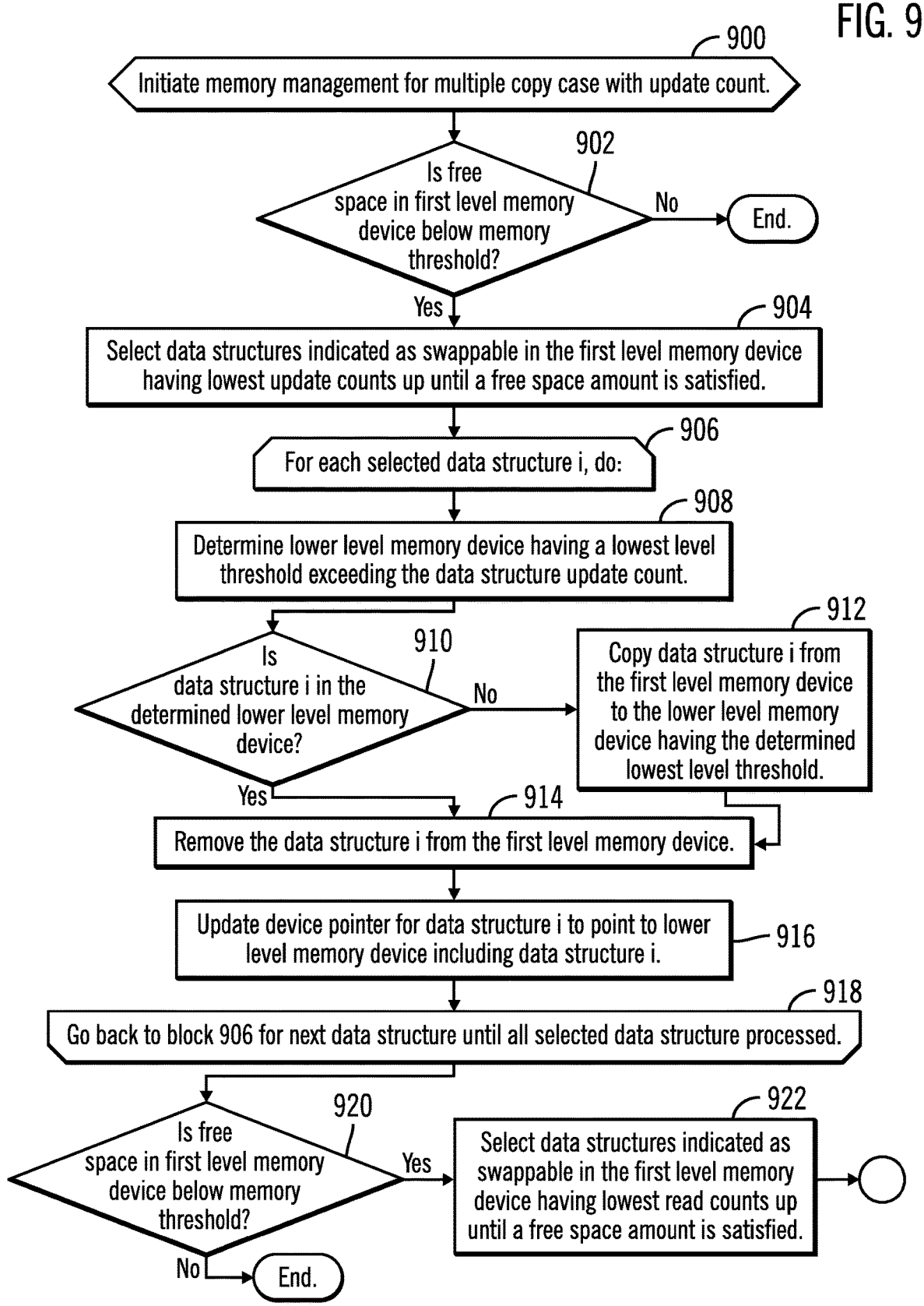
FIG. 9 illustrates an embodiment of operations to perform memory management operations to free space in a first level memory device for a multiple copy case where multiple copies of the data structures with separate update and read counts are stored throughout the memory subsystem.

FIG. 9 illustrates an embodiment of operations performed by the virtual memory manager 114 to perform memory management when copies of a data structure $118_i$ are maintained in multiple level memory devices $116_1 \ldots 116_n$. Upon initiating (at block 900) memory management for a multiple copy case with separate update and read counts, if (at block 902) the amount of free space in the first level memory device $116_1$ is above a memory threshold, then control ends. If (at block 902) the amount of free space is below the memory threshold, then the virtual memory manager 114 selects (at block 904) data structures $118_i$ in the first level memory device $116_1$ indicated as swappable having lowest update counts 206 that satisfy a free space amount. The operations at blocks 906 through 918 are performed for each of the selected data structure $118_i$.

The virtual memory manager 114 determines (at block 908) a lower level memory device $116_j$ having a lowest level threshold exceeding the data structure $118_i$ update count 206, which is the memory device having an endurance most suited for the update count of the selected data structure $118_i$. If (at block 910) the data structure $118_i$ is not in the determined lower level memory device $116_j$, then the virtual memory manager 114 copies (at block 912) the data structure $118_i$ from the first level memory device $116_1$ to the lower level memory device $116_j$ having the determined lowest level threshold. If (at block 910) the data structure $118_i$ is already in the determined lower level memory device $116_j$ or has been copied there (at block 912), then the data structure $118_i$ is removed (at block 914) from the first level memory device $116_1$ and the device pointer 212 is updated (at block 916) to indicate the lower level memory device $116_j$ now having the data structure $118_i$.

With the embodiment of FIG. 9, to free space in the first level memory device $116_1$, the virtual memory manager 114 considers data structures having a lowest update count, because such data structures are less frequently updated and most suitable for storage in a lower level memory device $116_2 \ldots 116_n$. The selected data structures having lowest update counts are removed from the first level memory device $116_1$ and retained in a lower level memory device $116_i$ having a level threshold containing the update count of the data structure to move.

Figure 10:
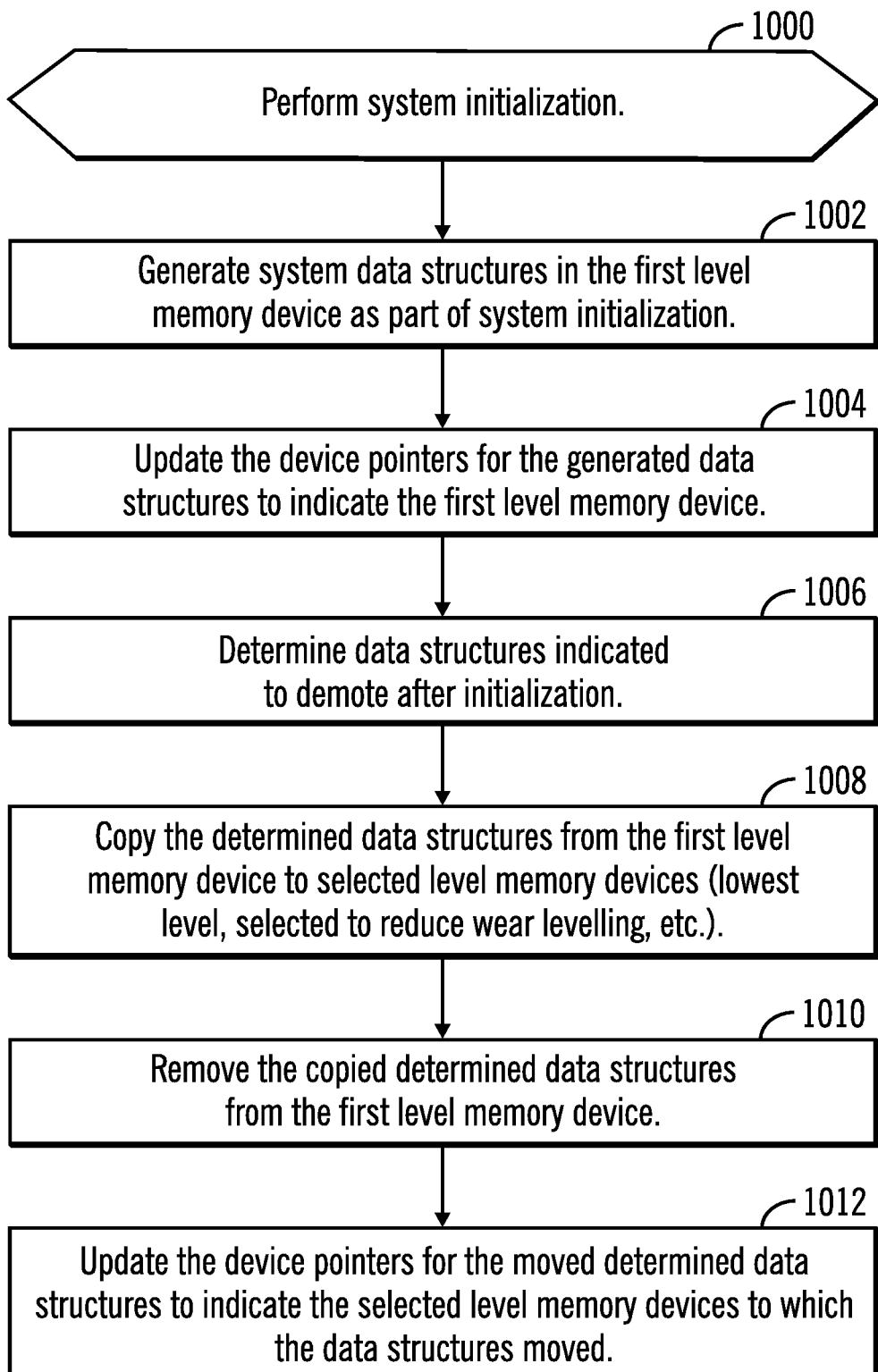
FIG. 10 illustrates an embodiment of operations to perform a system initialization and generate data structures in a memory subsystem with a plurality of memory devices.

FIG. 10 illustrates an embodiment of operations performed by the virtual memory manager 114 to generate data structures, such as system type data structures during system initialization, including data structures providing configuration information on logical subsystems, logical volumes, path groups, physical paths, logical paths, subsystem characteristics, and other configuration data. Upon performing system initialization (at block 1000), which may be initiated by a Basic Input Operating System (BIOS), initial microcode load (IML) or other boot device, system data structures are generated and stored (at block 1002) in the first level memory device $116_1$ as part of system initialization. The device pointers 212 in the data structure information $200_i$ for the generated system data structures $118_i$ is updated (at block 1004) to indicate the first level memory device $116_1$. The virtual memory manager 114 determines (at block 1006) the data structures $118_i$ whose data structure information 2001 indicates in field 210 that the data structures are to be demoted after initialization. The determined data structures are copied (at block 1008) from the first level memory device $116_1$ to selected lower level memory devices $116_i$. The selected lower memory devices may be selected based on an access count or update count to select a lower level memory device having an endurance profile suitable for the access or update count for the data structure, such as described with respect to FIGS. 7 and 9.

The copied determined data structures $118_i$ are removed (at block 1010) from the first level memory device $116_1$ and the device pointers 212 for the moved data structures $118_i$ are updated (at block 1012) to indicate the selected lower memory devices to which they are moved.

With the embodiment of FIG. 10, data structures that are indicated to demote, which may comprise those system data structures that are very infrequently accessed, are moved to a suitable lower level memory device $116_i$ because their infrequent access pattern indicates they will not need to be stored in the first level memory device $116_1$ after being initialized during system initialization.

Figure 11:
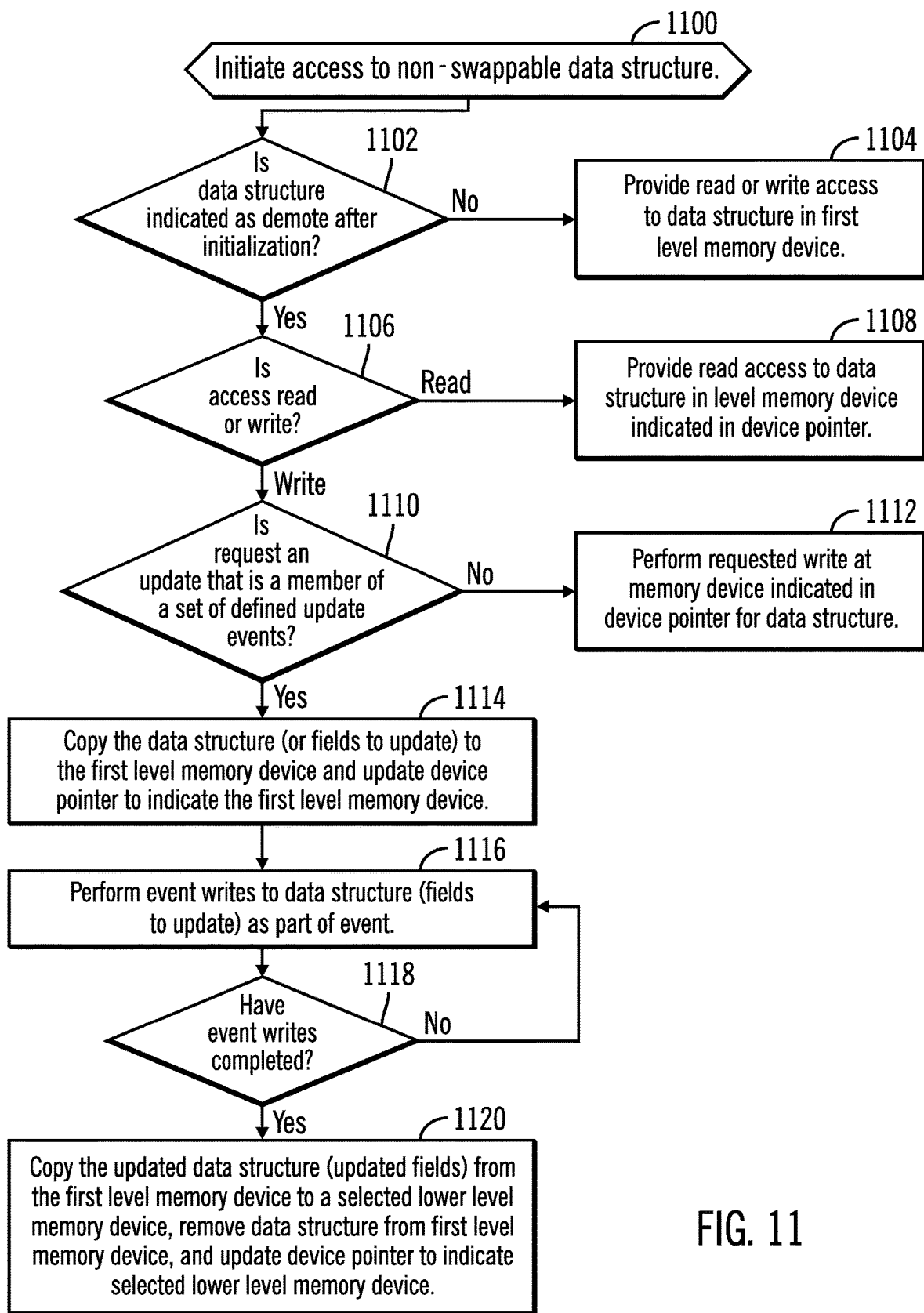
FIG. 11 illustrates an embodiment of operations to process access to data structures that are demoted after initialization in a memory subsystem of a plurality of memory devices.

FIG. 11 illustrates an embodiment of operations performed by the virtual memory manager 114 to process accesses to non-swappable data structures $118_i$, such as invoked at blocks 404, 604, and 804 in FIGS. 4, 6, and 8, respectively. Upon initiating (at block 1100) access to a non-swappable data structure $118_i$, if (at block 1102) the non-swappable data structure $118_i$ is not indicated as demote after initialization in field 210, then the virtual memory manager 114 provides (at block 1104) read or write access to the data structure $118_i$ in the first level memory device $116_1$. If (at block 1102) the data structure $118_i$ is demote after initialization status, then if (at block 1106) the access is a read, then the virtual memory manager 114 provides (at block 1108) read access to the data structure $118_i$ in the level memory device $116_i$ identified by the device pointer 212 in the data structure information $200_i$ for the accessed data structure $118_i$.

If (at block 1106) the access is a write and if (at block 1110) the update to the data structure $118_i$ is not a member of a set of defined update events, then the requested write is performed (at block 1112) at the lower level memory device $116_i$ indicated in the device pointer 212 for the data structure $118_i$. If (at block 1110) the update is a member of a set of defined update events, then the virtual memory manager 114 copies (at block 1114) the data structure $114_i$ (or specific fields or portions to update) to the first level memory device $116_1$ and updates the device pointer 212 to indicate the first level memory device $116_1$. Event writes are then performed (at block 1116) to the data structure $118_i$, or specific fields in the data structure, as part of the event. When the event related writes have completed (at block 1118), then the virtual memory manager 114 copies (at block 1120) the updated data structure $118_i$, or just the updated fields and portions, from the first level memory device $116_1$ to a selected lower level memory device $116_i$ (e.g., lowest level, selected to reduce wear levelling, etc.), removes the data structure $118_i$ from first level memory device $116_1$, and updates the device pointer 212 to indicate the selected lower level memory device $116_i$.

In one embodiment, the defined set of events that triggers moving the data structure to the first level memory device $116_1$ may comprise data structures that are system configuration files very infrequently updated, such as additional or removal of a logical subsystem, volumes, path groups, physical paths, and logical paths. The update events may also comprise updating configuration information with new subsystem characteristics and other information.

With the operations of FIG. 11, a data structure $118_i$ identified as a demote after initialization which is mostly stored in a lower level memory device $116_i$ may be periodically staged into the first level memory device $116_1$ for a burst of writes as part of operations to update system configuration files. Because such configuration files are very infrequently updated, after the update event, the system data structure may be moved back to a lower level memory device for storage and access. This frees up space in the faster access first level memory device $116_1$ for other more frequently accessed data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
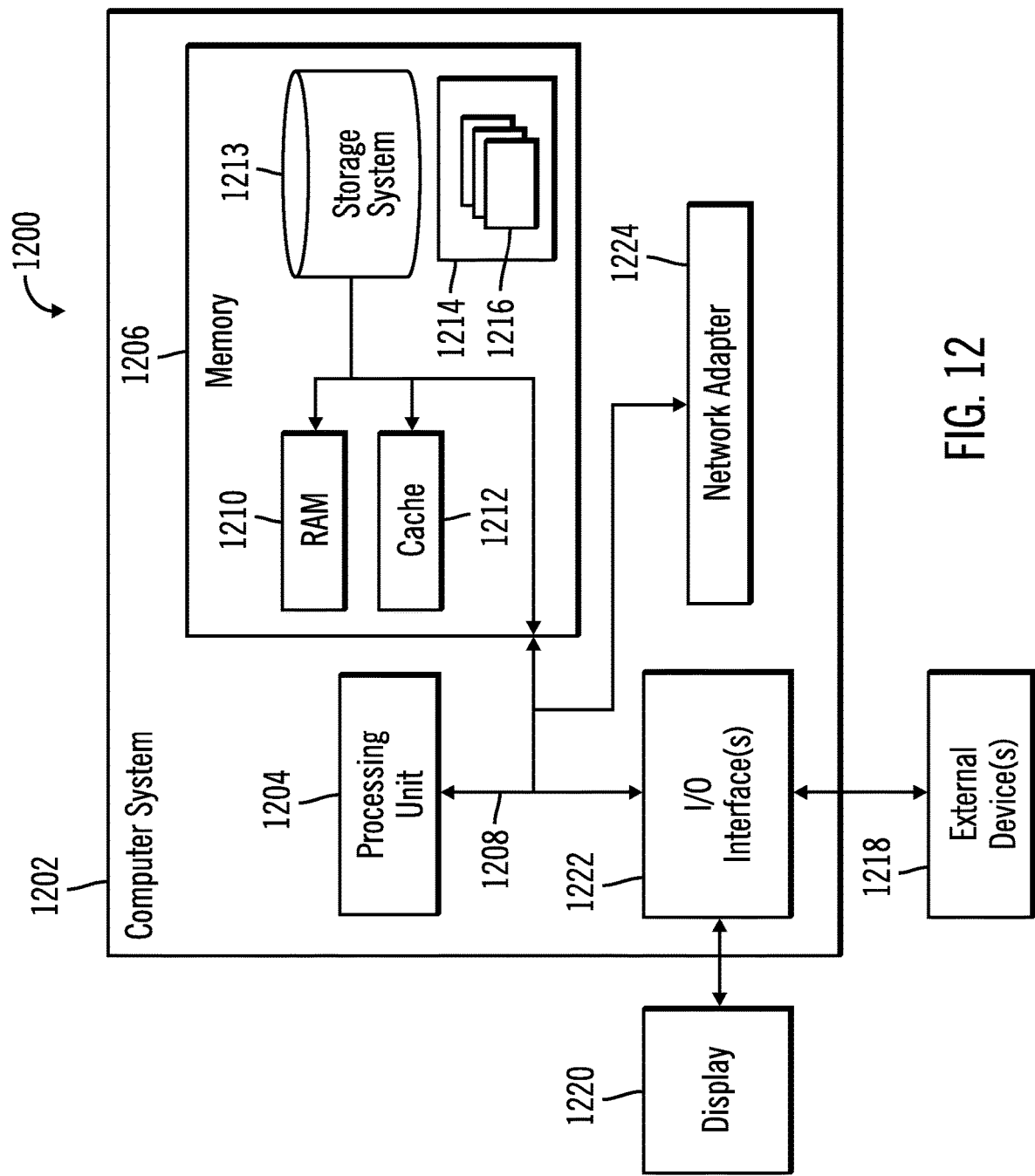
FIG. 12 illustrates a computing environment in which the components of FIG. 1 may be implemented.

The computational components of FIG. 1, including the hosts 102 and storage controller 104, may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data in a plurality of memory devices in a computing system, the computer program product comprising a computer readable storage medium having computer readable program code embodied therein that when executed performs operations, the operations comprising:
    indicating data structures to demote as part of system initialization from a first level memory device to a second level memory device, wherein the first level memory device has lower latency than the second level memory device, wherein the data structures are identified as having a file name or object name, and comprise configuration information for the computing system generated by an operating system as part of the system initialization; and
    as part of completing the system initialization and generating the data structures in the first level memory device, immediately copying the data structures indicated to demote as part of the system initialization from the first level memory device to the second level memory device and removing the data structures indicated to demote as part of the system initialization from the first level memory device.

2. The computer program product of claim 1, wherein the operations further comprise:
    receiving a read request to a data structure stored in the second level memory device; and
    returning data to the read request from the data structure stored in the second level memory device.

3. The computer program product of claim 1, wherein the operations further comprise:
    maintaining access counts for the data structures stored in the first level memory device that are not indicated to demote as part of system initialization, wherein access counts are not maintained for data structures indicated to demote as part of system initialization.

4. The computer program product of claim 3, wherein the operations further comprise:
    using the access counts to select data structures to remove from the first level memory device and retain in the second level memory device to free space in the first level memory device; and
    using the access counts to determine whether to remove accessed data structures from the second level memory device.

5. The computer program product of claim 1, wherein the operations further comprise:
    receiving an update to a data structure indicated to demote as part of system initialization;
    copying the data structure to update from the second level memory device to the first level memory device to update;
    updating the data structure with the update; and
    copying the updated data structure from the first level memory device to the second level memory device and deleting the updated data structure from the first level memory device.

6. A computer program product for managing data in a plurality of memory devices in a computing system, the computer program product comprising a computer readable storage medium having computer readable program code embodied therein that when executed performs operations, the operations comprising:
    receiving an update to a data structure indicated to demote as part of system initialization from a first level memory device, wherein the data structure is identified as having a file name or object name, and comprises configuration information for the computing system generated by an operating system as part of the system initialization, wherein the data structure indicated to demote as part of system initialization is immediately demoted from the first level memory device in response to being generated in the first level memory device as part of the system initialization operations;
    copying the data structure to update from a second level memory device to the first level memory device to update, wherein the first level memory device has lower latency than the second level memory device;
    updating the data structure with the update; and
    copying the updated data structure from the first level memory device to the second level memory device and deleting the updated data structure from the first level memory device in response to completing updating the data structure.

7. The computer program product of claim 6, wherein the update to the data structure is to at least one field in the data structure to update that is less than all the fields in the data structure, wherein the copying the data structure comprises copying only the at least one field to update from the data structure to the first level memory device, wherein the copying the updated data structure comprises copying the updated at least one field from the first level memory device to the second level memory device and deleting the updated at least one field from the first level memory device.

8. The computer program product of claim 6, wherein the data structure to update is in the second level memory device, wherein the operations further comprise:
    determining whether the update comprises an update event of a plurality of predefined update events;
    copying the data structure to update to the first level memory device in response to determining the update comprises the update event;
    performing a plurality of writes to the data structure as part of the update event; and
    copying the data structure updated as part of the update event from the first level memory device to the second level memory device and deleting the updated data structure from the first level memory device in response to completing the writes for the update event.

9. The computer program product of claim 8, wherein the predefined update events comprise a plurality of update events that are a member of a subset of update events comprising additional or removal of a logical device in the computing system; a volume in the computing system; path groups; physical paths; logical paths; and subsystem characteristics and other configuration changes.

10. The computer program product of claim 8, wherein the operations further comprise:
    performing the update to the data structure to update in the second level memory device in response to determining that the update does not comprise one of the plurality of predefined update events.

11. A system, comprising:
a first level memory device;
a second level memory device;
a virtual memory manager to perform:
   indicating data structures to demote as part of system initialization from a first level memory device to a second level memory device, wherein the first level memory device has lower latency than the second level memory device, wherein the data structures are identified as having a file name or object name, and comprise configuration information for the system generated by an operating system as part of the system initialization; and
   as part of completing the system initialization and generating the data structures in the first level memory device, immediately copying the data structures indicated to demote as part of system initialization from the first level memory device to the second level memory device and removing the data structures indicated to demote as part of system initialization from the first level memory device.

12. The system of claim 11, wherein the operations further comprise:
receiving a read request to a data structure stored in the second level memory device; and
returning data to the read request from the data structure stored in the second level memory device.

13. The system of claim 11, wherein the operations further comprise:
maintaining access counts for the data structures stored in the first level memory device that are not indicated to demote as part of system initialization, wherein access counts are not maintained for data structures indicated to demote as part of system initialization.

14. The system of claim 13, wherein the operations further comprise:
using the access counts to select data structures to remove from the first level memory device and retain in the second level memory device to free space in the first level memory device; and
using the access counts to determine whether to remove accessed data structures from the second level memory device.

15. The system of claim 11, wherein the operations further comprise:
receiving an update to a data structure indicated to demote as part of system initialization;
copying the data structure to update from the second level memory device to the first level memory device to update;
updating the data structure with the update; and
copying the updated data structure from the first level memory device to the second level memory device and deleting the updated data structure from the first level memory device.

16. A system, comprising:
a first level memory device;
a second level memory device;
a virtual memory manager to perform:
   receiving an update to a data structure indicated to demote as part of system initialization from a first level memory device, wherein the data structure is identified as having a file name or object name, and comprises configuration information for the system generated by an operating system as part of the system initialization, wherein the data structure indicated to demote as part of system initialization is immediately demoted from the first level memory device in response to being generated in the first level memory device as part of the system initialization operations;
   copying the data structure to update from the second level memory device to the first level memory device to update, wherein the first level memory device has lower latency than the second level memory device;
   updating the data structure with the update; and
   copying the updated data structure from the first level memory device to the second level memory device and deleting the updated data structure from the first level memory device in response to updating the data structure.

17. The system of claim 16, wherein the update to the data structure is to at least one field in the data structure to update that is less than all the fields in the data structure, wherein the copying the data structure comprises copying only the at least one fields to update from the data structure to the first level memory device, wherein the copying the updated data structure comprises copying the updated at least one field from the first level memory device to the second level memory device and deleting the updated at least one field from the first level memory device.

18. The system of claim 16, wherein the data structure to update is in the second level memory device, wherein the virtual memory manager further performs:
determining whether the update comprises an update event of a plurality of predefined update events;
copying the data structure to update to the first level memory device in response to determining the update comprises the update event;
performing a plurality of writes to the data structure as part of the update event; and
copying the data structure updated as part of the update event from the first level memory device to the second level memory device and deleting the updated data structure from the first level memory device in response to completing the writes for the update event.

19. The system of claim 18, wherein the predefined update events comprise a plurality of update events that are a member of a subset of update events comprising additional or removal of a logical device in the system; a volume in the system; path groups; physical paths; logical paths; and subsystem characteristics and other configuration changes.

20. The system of claim 18, wherein the virtual memory manager further performs:
performing the update to the data structure to update in the second level memory device in response to determining that the update does not comprise one of the plurality of predefined update events.

21. A method for managing data in a plurality of memory devices in a computing system, comprising:
indicating data structures to demote as part of system initialization from a first level memory device to a second level memory device, wherein the first level memory device has lower latency than the second level memory device, wherein the data structures are identified as having a file name or object name, and comprise configuration information for the computing system generated by an operating system as part of the system initialization; and
as part of completing the system initialization and generating the data structures in the first level memory device, immediately copying the data structures indicated to demote as part of system initialization from the first level memory device to the second level memory device and removing the data structures indicated to demote as part of system initialization from the first level memory device.

22. The method of claim 21, further comprising:

receiving a read request to a data structure stored in the second level memory device; and returning data to the read request from the data structure stored in the second level memory device.

23. The method of claim 21, further comprising:

maintaining access counts for the data structures stored in the first level memory device that are not indicated to demote as part of system initialization, wherein access counts are not maintained for data structures indicated to demote as part of system initialization.

24. The method of claim 23, further comprising:

using the access counts to select data structures to remove from the first level memory device and retain in the second level memory device to free space in the first level memory device; and using the access counts to determine whether to remove accessed data structures from the second level memory device.

25. The method of claim 23, further comprising:

receiving an update to a data structure indicated to demote as part of system initialization;

copying the data structure to update from the second level memory device to the first level memory device to update;

updating the data structure with the update; and copying the updated data structure from the first level memory device to the second level memory device and deleting the updated data structure from the first level memory device.

* * * * *